United States Patent
Chang

(10) Patent No.: US 10,656,694 B2
(45) Date of Patent: May 19, 2020

(54) METHOD AND SYSTEM FOR CONTROLLING OPERATION UNIT, AND COMPUTER STORAGE MEDIUM

(71) Applicant: ONEPLUS TECHNOLOGY (SHENZHEN) CO., LTD., Shenzhen (CN)

(72) Inventor: Wenyen Chang, Shenzhen (CN)

(73) Assignee: ONEPLUS TECHNOLOGY (SHENZHEN) CO., LTD., Shenzhen (CN)

( * ) Notice: Subject to any disclaimer, the term of this patent is extended or adjusted under 35 U.S.C. 154(b) by 174 days.

(21) Appl. No.: 15/747,547

(22) PCT Filed: Jun. 24, 2016

(86) PCT No.: PCT/CN2016/087152
§ 371 (c)(1),
(2) Date: Jan. 25, 2018

(87) PCT Pub. No.: WO2017/016358
PCT Pub. Date: Feb. 2, 2017

(65) Prior Publication Data
US 2018/0217653 A1 Aug. 2, 2018

(30) Foreign Application Priority Data

Jul. 28, 2015 (CN) .......................... 2015 1 0451908

(51) Int. Cl.
*G06F 1/00* (2006.01)
*G06F 1/3203* (2019.01)
(Continued)

(52) U.S. Cl.
CPC ............ *G06F 1/3203* (2013.01); *G06F 1/324* (2013.01); *G06F 9/50* (2013.01); *G06F 11/3024* (2013.01);
(Continued)

(58) Field of Classification Search
CPC ..................................................... G06F 1/3203
See application file for complete search history.

(56) References Cited

U.S. PATENT DOCUMENTS

2003/0074591 A1* 4/2003 McClendon ............ G06F 1/206
713/322
2005/0172158 A1 8/2005 McClendon
(Continued)

FOREIGN PATENT DOCUMENTS

CN 102023697 A 4/2011
CN 103823716 A 5/2014
(Continued)

OTHER PUBLICATIONS

Supplementary European Search Report in European application No. 16829724.0, dated Jul. 23, 2018.
(Continued)

*Primary Examiner* — Mohammed H Rehman
(74) *Attorney, Agent, or Firm* — Syncoda LLC; Feng Ma

(57) ABSTRACT

A method for controlling an operation unit, a system for controlling an operation unit, and a computer storage medium are provided. The method includes: determining a relative current value; determining target frequencies corresponding to all currently running operation units, determining the temperatures of all of the currently running operation units, and calculating the sum of current values of all of the currently running operation units based on the target frequencies and the temperatures, wherein the target frequency corresponding to each running operation unit is a series of frequencies with which the operation unit can run; and comparing the calculated sum of the current values with the determined relative current value, and if the sum of the current values is smaller than the relative current value,
(Continued)

determining the target frequency corresponding to the sum of the current values as a running frequency to be selected.

12 Claims, 3 Drawing Sheets

(51) Int. Cl.
    *G06F 9/50*     (2006.01)
    *G06F 1/324*     (2019.01)
    *G06F 11/30*     (2006.01)
    *G06F 11/34*     (2006.01)

(52) U.S. Cl.
    CPC ...... *G06F 11/3058* (2013.01); *G06F 11/3442* (2013.01); *Y02D 10/126* (2018.01)

(56) References Cited

U.S. PATENT DOCUMENTS

| | | |
|---|---|---|
| 2007/0174650 A1 | 7/2007 | Won |
| 2008/0022140 A1* | 1/2008 | Yamada .................. G06F 1/206 713/322 |
| 2012/0216029 A1 | 8/2012 | Shah |
| 2012/0216058 A1 | 8/2012 | Wells |
| 2012/0272086 A1 | 10/2012 | Anderson |
| 2014/0115351 A1* | 4/2014 | Ananthakrishnan ...... G06F 1/26 713/300 |
| 2014/0359328 A1 | 12/2014 | Burns |
| 2015/0026495 A1 | 1/2015 | Jain et al. |
| 2015/0121105 A1 | 4/2015 | Ahn |
| 2015/0301744 A1* | 10/2015 | Kim ....................... G06F 3/0679 711/103 |
| 2016/0147280 A1* | 5/2016 | Thomas ................. G06F 1/206 |
| 2016/0314229 A1* | 10/2016 | Bickford ............. G06F 17/5031 |

FOREIGN PATENT DOCUMENTS

| | | |
|---|---|---|
| CN | 104011626 A | 8/2014 |
| CN | 104679586 A | 6/2015 |
| CN | 105068872 A | 11/2015 |
| WO | 2008117248 A1 | 10/2008 |

OTHER PUBLICATIONS

English Translation of the International Search Report in international application No. PCT/CN2016/087152, dated Oct. 8, 2016.
English Translation of the Written Opinion of the International Search Authority in international application No. PCT/CN2016/087152, dated Oct. 8, 2016.

\* cited by examiner

METHOD AND SYSTEM FOR CONTROLLING OPERATION UNIT, AND COMPUTER STORAGE MEDIUM

TECHNICAL FIELD

The disclosure relates to a current control technology for a group of processing units, and particularly to a method and system for controlling a processing unit, and a computer storage medium, which can achieve high efficiency.

BACKGROUND

With the development of technology, a calculation capability of a processor for an intelligent mobile terminal (for example, a mobile phone and a tablet computer) gets increasingly higher. There are more and more processing units included in a tiny physical package in a processor, such that a problem of heat generation of the processor is becoming a growing concern. During current control over processing units in a conventional art, allowable maximum execution frequencies and execution voltages of the processing units are dynamically regulated with reference to temperature rises and a maximum current that the whole machine can supply, so as to control a maximum current during execution of the processing units. With development of multi-processing-unit groups (multiple cores), more and more platforms are designed to share the same frequency by multiple processing units, and idle processing units in a multi-processing-unit group independently enter a deep sleep mode, so as to achieve both power saving and reduction in a number of power rails and clock sources.

However, controlling maximum operable frequency of a processing unit to achieve a purpose of controlling current of the processing unit may cause suppression of performance of all the processing units sharing a same clock source simultaneously, resulting in a poor user experience. In addition, most of triggering points for current control in the conventional art are temperature threshold value triggering, and consideration points are all reducing currents at high temperatures to avoid continuous accumulation of heat.

SUMMARY

In view of this, embodiments of the disclosure are expected to provide a method and system for controlling a processing unit, and a computer storage medium, which can achieve high efficiency and improve a user experience.

The embodiments of the disclosure provide a method for controlling a processing unit, which includes the following steps:

a relative current value is determined;

target frequencies corresponding to all currently operating processing units are determined, temperatures of all the currently operating processing units are determined, and a sum of current values of all the currently operating processing units is calculated based on each of the target frequencies and the temperatures, wherein the target frequencies corresponding to each operating processing unit are a series of operable frequencies of the processing unit; and the calculated sum of the current values is compared with the determined relative current value, and in the case that the sum of the current values is lower than the relative current value, it is determined that the target frequency corresponding to the sum of the current values is an operating frequency to be selected.

In one embodiment, the step that the relative current value is determined may include that:

performance corresponding to a system requirement and/or an application requirement is determined; and the relative current value is determined according to the performance.

In one embodiment, the step that the performance corresponding to the system requirement and/or the application requirement is determined may include that:

a total number of required processing units is acquired according to the system requirement and/or the application requirement;

operating frequencies required by the processing units are acquired according to the system requirement and/or the application requirement; and temperatures of the processing units are determined.

In one embodiment, the step that the sum of the current values of all the currently operating processing units is calculated based on each of the target frequencies and the temperatures may include that:

a current value of each processing unit is calculated based on the target frequency and temperature of each processing unit; and the calculated current values are added to obtain the sum of the current values of all the operating processing units.

In one embodiment, the method may further include the steps that: the target frequencies are sequenced from high to low, a sum of current values, corresponding to a highest target frequency, of all the currently operating processing units is calculated initially, and in the case that the calculated sum of the current values is higher than the relative current value, a next target frequency is determined according to a sequence of the target frequencies, and a sum of current values, corresponding to the next target frequency, of all the currently operating processing units is calculated.

The embodiments of the disclosure further provide a system for controlling a processing unit, which include:

a control module, configured to determine a relative current value and to determine target frequencies corresponding to all currently operating processing units;

a temperature sensor, configured to determine temperatures of all the currently operating processing units;

an instant power calculator, configured to calculate a sum of current values of all the currently operating processing units based on each of the target frequencies and the temperatures, wherein the target frequencies corresponding to each operating processing unit are a series of operable frequencies of the processing unit, the control module being further configured to compare the calculated sum of the current values with the determined relative current value, and in the case that the sum of the current values is lower than the relative current value, determine the target frequency corresponding to the sum of the current values as an operating frequency to be selected; and a processing unit group component, configured to receive the operating frequency to be selected, and set the operating frequency to be selected as an operating frequency of all the currently operating processing units.

In one embodiment, the control module may further be configured to determine performance corresponding to a system requirement and/or an application requirement, and to determine the relative current value according to the performance.

In one embodiment, the control module may further be configured to acquire a total number of required processing units according to the system requirement and/or the application requirement;

the control module may further be configured to acquire operating frequencies required by the processing units according to the system requirement and/or the application requirement; and the temperature sensor may further be configured to determine temperatures of the processing units.

In one embodiment, the instant power calculator may further be configured to calculate a current value of each processing unit based on the target frequency and temperature of each processing unit, and to add the calculated current values to obtain the sum of the current values of all the operating processing units.

In one embodiment, the control module may further be configured to sequence the target frequencies from high to low, calculate a sum of current values, corresponding to a highest target frequency, of all the currently operating processing units initially, and in the case that the calculated sum of the current values is higher than the relative current value, determine a next target frequency according to a sequence of the target frequencies, and calculate a sum of current values, corresponding to the next target frequency, of all the currently operating processing units.

The embodiments of the disclosure further provide a computer storage medium having stored therein computer-executable instructions for executing the method for controlling a processing unit in the embodiments of the disclosure.

According to the method and system for controlling a processing unit and the computer storage medium provided by the embodiments of the disclosure, the relative current value is determined in advance, and then the relative current value is determined as a reference. Then, the sum of the current values of the practically operating processing units is calculated according to each of the target frequencies and current temperatures, the sum of the current values is compared with the relative current value determined as the reference, and if the sum of the current values is lower than the relative current value, the target frequency corresponding to the sum of the current values may be determined as an operating frequency to be selected for the currently operating processing units. When a highest operating frequency to be selected is determined, the highest operating frequency to be selected is set to be the operating frequency of the currently operating processing units. That is, within a range of the relative current value, it not only may meet an operating condition of the processing units to achieve current suppression and improve efficiency of the processing units, but also may prevent suppression of operating performance of the processing units, thereby improving a user experience.

DETAILED DESCRIPTION

For conveniently understanding the disclosure, the disclosure will be described more comprehensively below with reference to the related drawings. The drawings show preferred embodiments of the disclosure. However, the disclosure may be implemented in many different forms, and is not limited to the embodiments described in the disclosure. On the contrary, these embodiments are provided to make the contents disclosed in the disclosure understood more thoroughly and comprehensively.

Unless otherwise defined, all technical and scientific terms used in the disclosure have same meanings with that usually understood by those skilled in the art of the disclosure. Herein, terms used in the specification of the disclosure are adopted not to limit the disclosure but only for a purpose of describing specific embodiments. Term "and/or" used in the disclosure includes any one and all combinations of one or more related items which are listed.

A processing unit in the disclosure may be a processing unit in a single System on Chip (SoC) processing chip, and it may be a core of a Central Processing Unit (CPU) in a processor. For example, a CPU in an existing typical processor for a mobile terminal, like a multi-core Snapdragon™ processor of the Qualcomm Incorporated for mobile phones and the like, may have 4, 6 or 8 cores. The processing unit may also be a Graphics Processing Unit (GPU) in the processor. It can be understood that those skilled in the art may realize that the processing unit is not limited to the above two examples, and in other embodiments, the processing unit may be a component with a calculation capability in a processor, such as a core, a master core, a sub-core and a hardware engine. The processing unit may be a single one or combination of the abovementioned examples.

Figure 1:
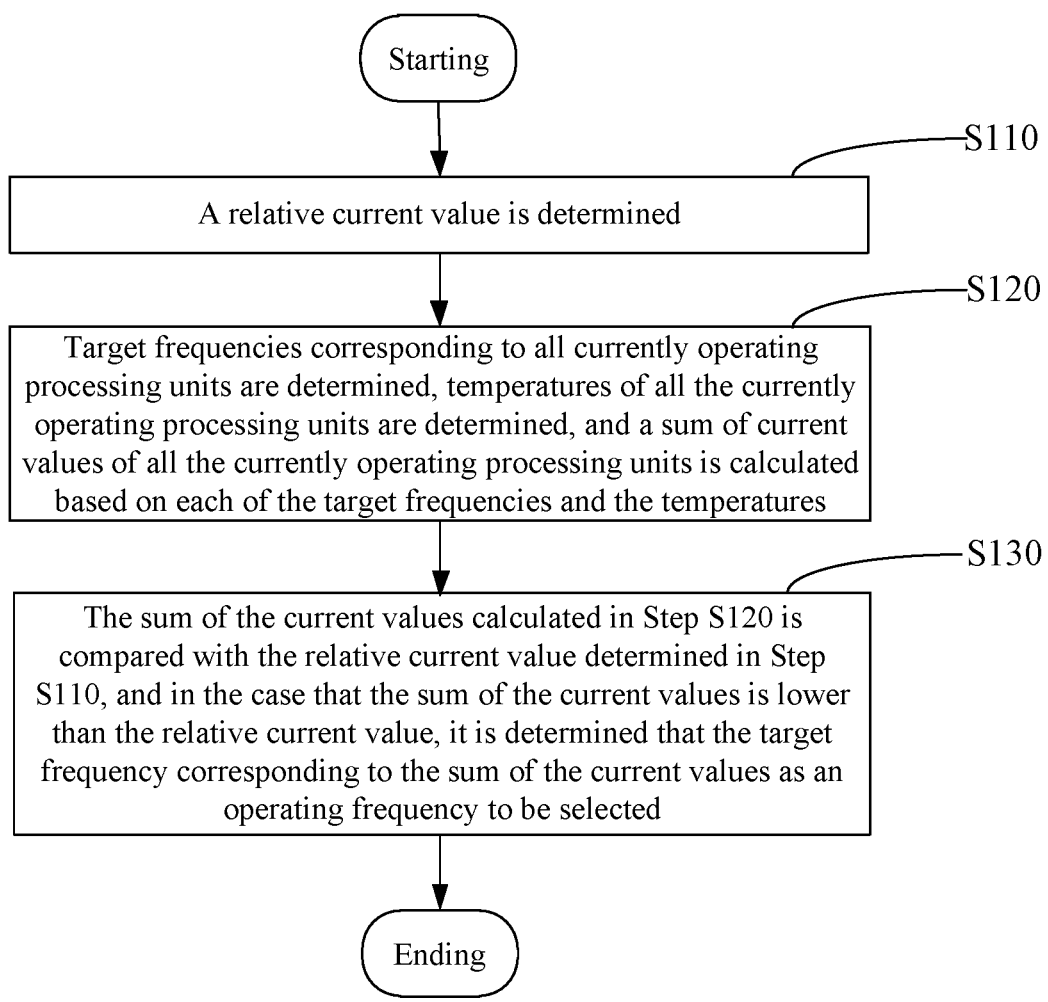
FIG. 1 is a flowchart of a method for controlling a processing unit.

FIG. 1 is a flowchart of a method for controlling a processing unit according to an embodiment of the disclosure. The method includes the following steps.

In Step S110, a relative current value is determined.

In the embodiment, the relative current value is determined according to a requirement, and the requirement refers to a system requirement and/or an application requirement. Specifically, required performance is determined according to a requirement of a system (for example, an operating system of a mobile phone) and/or an application (for example, an application running in the mobile phone). The performance is defined by "temperature (° C.)|number of processing units|operating frequency (MHz)".

Specifically, the step that determining the performance corresponding to the requirement of the system and/or the requirement of the application includes that:

a total number of required processing units is acquired according to the requirement;

operating frequencies required by the processing units are acquired according to the requirement; and temperatures of the processing units are determined.

In an embodiment, the operating frequency of the processing unit is inversely proportional to the temperature of the processing unit, which is consistent with a typical temperature-based control strategy for the processing unit. For example, when the temperature of the processing unit is relatively high, maximum operable frequency of the processing unit is reduced, and when the temperature of the processing unit is reduced, the maximum operable frequency is increased. The temperature corresponding to the operating frequency may be determined according to a pre-stored relationship table between operating frequencies and temperatures. It can be understood that a method for determining the temperatures is not limited to the abovementioned manner.

For example, two applications (for example, an instant messaging application and a music player) are currently running on an intelligent mobile terminal simultaneously, it is determined according to a requirement that the required performance is "60|2|700", i.e., a performance achieved by two processing units operating at 700 MHz at 60° C. With such performance, a system and the applications may run smoothly/without lag. That is, there are no conditions influencing a user experience such as crash and slow response even when the system and the applications run at this frequency with a 100% utilization rate of the processing units.

In the embodiment, the operation that the relative current value is determined according to the requirement may refer to a current value of the processing unit is obtained through actual measurement. For example, current values at different performance are premeasured and stored. For example, when the performance is "60|2|700", two processing units are operating at this moment, and the relative current value corresponding to the performance "60|2|700" equals to a sum of measured current values of the two processing units.

In addition, in another embodiment, the operation that the relative current value is determined according to the requirement may further refer to that the relative current value is calculated based on a specific formula. For example, relative current value=$Vt*Fn/(1-Lt)$, where Vt is a corrected voltage of a processing unit at a temperature t, Fn is nth power of an operating frequency of the processing unit, and Lt is a voltage conversion loss rate at the temperature t, wherein $0<=Lt<1$.

In Step S120, target frequencies corresponding to all currently operating processing units are determined, temperatures of all the currently operating processing units are determined, and a sum of current values of all the currently operating processing units is calculated based on each of the target frequencies and the temperatures. The target frequencies corresponding to each operating processing unit are a series of operable frequencies of the processing unit.

In an embodiment, the target frequencies corresponding to each processing unit are pre-stored. For example, the target frequencies include 384 MHz, 480 MHz, 768 MHz, 864 MHz, 960 MHz, 1,248 MHz, 1,344 MHz, 1,632 MHz and 1,766 MHz. It is important to note that, in an embodiment, if the currently operating processing units share the same clock source, the operating frequencies of the currently operating processing units may be synchronously regulated.

In an embodiment, each processing unit is provided with a corresponding temperature sensor, and a temperature of each processing unit at any moment may be obtained through the temperature sensor.

Specifically, the step that the sum of the current values of all the currently operating processing units is calculated based on each of the target frequencies and the temperatures includes the following steps.

At first, a current value of each processing unit is calculated based on a target frequency and temperature of each processing unit.

Specifically, the current value of each currently operating processing unit may be calculated by adopting the formula $Vt*Fn/(1-Lt)$, Vt being the corrected voltage of the processing unit at the temperature t, Fn being the nth power of the operating frequency of the processing unit and Lt being the voltage conversion loss rate at the temperature t, wherein $0<=Lt<1$.

Then, the calculated current values are added to obtain the sum of the current values of all the operating processing units.

In an embodiment, if a processor (for example, the multi-core Snapdragon™ processor) including multiple processing resources is provide with an instant power calculator, the instant power calculator may be utilized to calculate the sum of the current values of all the currently operating processing units. The instant power calculator also performs calculation according to the target frequency and temperature of each operating processing unit. The instant power calculator may also calculate the sum of the current values of all the currently operating processing units more accurately, taking into account states (for example, idle or operating) of the current processing units.

In Step S130, the sum of the current values calculated in Step S120 is compared with the relative current value in Step S110, and in the case that the sum of the current values is lower than the relative current value, the target frequency corresponding to the sum of the current values is determined as an operating frequency to be selected.

Figure 3:
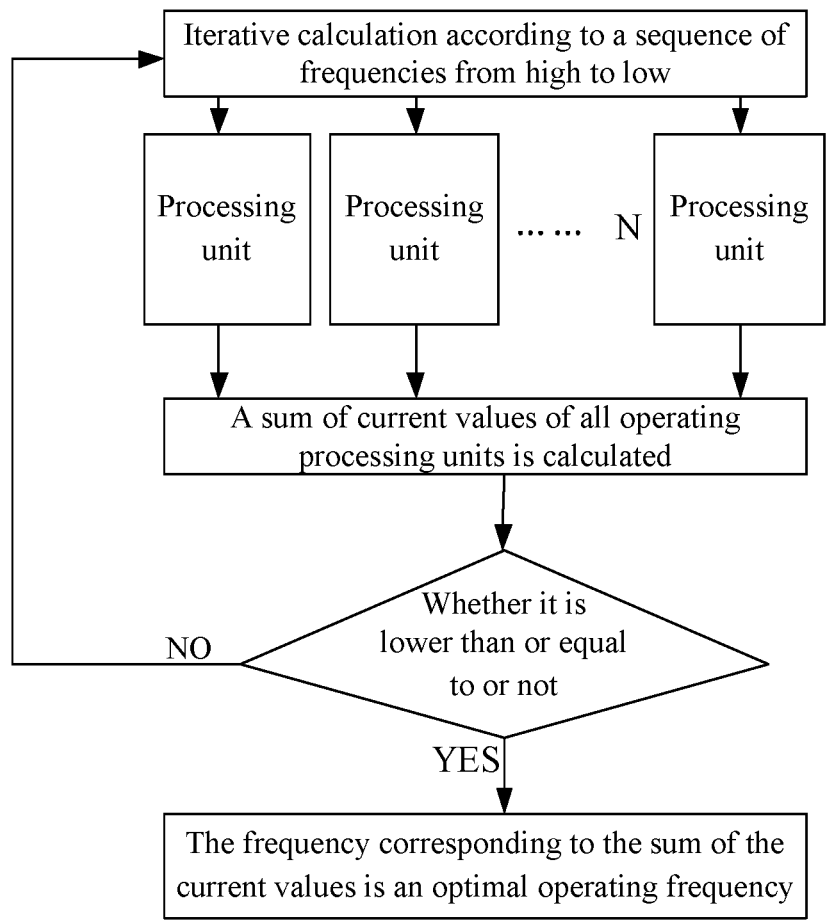
FIG. 3 is a flowchart of searching for an optimal operating frequency.

FIG. 3 is a flowchart of searching for an optimal operating frequency. In combination with FIG. 3, in the embodiment, the target frequencies are sequenced from high to low. Initially, a sum of current values, corresponding to the highest target frequency, of all the currently operating processing units is calculated. If the calculated sum of the current values is higher than the relative current value, next target frequency is determined according to a sequence of the target frequencies, and then the process returns to step S120 to calculate a sum of current values, corresponding to the next target frequency, of all the currently operating processing units.

In accordance with a cycle calculation described above, the first determined operating frequency to be selected corresponding to the sum of the current values lower than the relative current value is the maximum in all operating frequencies to be selected, and at this moment, the maximum in all the operating frequencies to be selected is set to be the operating frequency of all the operating processing units.

In the embodiment, the currently operating processing units share the same clock source, and there is made such a hypothesis that the currently operating processing units have the same target frequencies: 384 MHz, 480 MHz, 768 MHz, 864 MHz, 960 MHz, 1,248 MHz, 1,344 MHz, 1,632 MHz and 1,766 MHz. The sum of the current values, corresponding to each target frequency, of all the currently operating processing units is calculated in sequence according to the sequence of the target frequencies from high to low until the maximum frequency to be selected corresponding to the sum of the current values, lower than the relative current value, of all the currently operating processing units is found.

In another embodiment, besides the maximum frequency to be selected, a specific number of frequencies to be selected may further be determined. All of the specific number of frequencies to be selected are lower than the maximum frequency to be selected, and are not optimal objects for selection, but may be determined as alternate frequencies.

For example, the required performance is "60|2|700", if there is only one processing unit operating at present at 60° C., and the other processing units are idle or turned off, a selected maximum frequency to be selected is undoubtedly higher than 700 MHz, that is, performance which may be achieved is higher than the required performance. For another example, if there are 3 processing units being used at present and their temperatures are only 40° C., there exists a high probability that a finally selected maximum frequency to be selected is higher than 700 MHz so as to achieve performance meeting the user experience within the specified relative current value.

Based on the above embodiments, choices which may be lower than the specified relative current value to save energy resources and also meet the performance with a highest probability are provided, and the method is centered on a user, so that the user experience may be improved.

An embodiment of the disclosure further provides a computer storage medium, in which computer-executable instructions are stored, the computer-executable instructions being configured to execute the method for controlling the processing unit in the embodiments of the disclosure.

Figure 2:
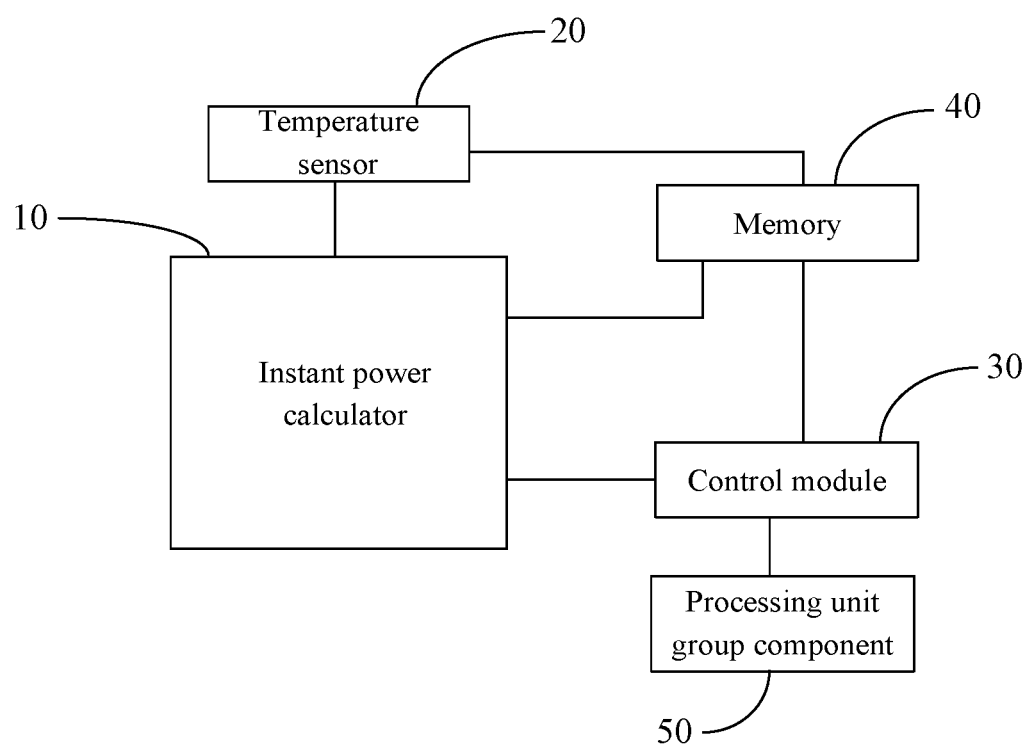
FIG. 2 is a block diagram of a system for controlling a processing unit.

FIG. 2 is a block diagram of a system for controlling a processing unit.

A system for controlling a processing unit includes the following modules.

A control module 30 is configured to determine a relative current value and to determine target frequencies corresponding to all currently operating processing units.

A memory 40 is configured to store the relative current value and the target frequencies.

A temperature sensor 20 is configured to determine temperatures of all the currently operating processing units.

An instant power calculator 10 is configured to calculate a sum of current values of all the currently operating processing units based on each of the target frequencies and the temperatures, wherein target frequencies corresponding to each operating processing unit are a series of operable frequencies of the processing unit.

The control module 30 is further configured to compare the calculated sum of the current values with the determined relative current value, and if the sum of the current values is lower than the relative current value, determine a target frequency corresponding to the sum of the current values as an operating frequency to be selected.

A processing unit group component 50 is configured to receive the operating frequency to be selected, and to set the operating frequency to be selected as an operating frequency of all the currently operating processing units.

In an embodiment, the control module 30 is further configured to determine performance corresponding to a system requirement and/or an application requirement, and determine the relative current value according to the performance.

In an embodiment, the control module 30 is further configured to acquire a total number of required processing units according to the system requirement and/or the application requirement.

The control module 30 is further configured to acquire operating frequencies required by the processing units according to the system requirement and/or the application requirement.

The temperature sensor 20 is further configured to determine temperatures of the processing units.

In an embodiment, the instant power calculator 10 is further configured to calculate a current value of each processing unit based on target frequencies and temperature of each processing unit, and add the calculated current values to obtain the sum of the current values of all the operating processing units.

In an embodiment, the control module 30 is further configured to sequence the target frequencies from high to low, calculate a sum of current values, corresponding to the highest target frequency, of all the currently operating processing units initially, and if the calculated sum of the current value is higher than the relative current value, determine next target frequency according to a sequence of the target frequencies, and calculate a sum of the current values, corresponding to the next target frequency, of all the currently operating processing units.

According to the method and system for controlling a processing unit, the relative current value is determined in advance, and then the relative current value is determined as a reference. Then, the sum of current values of the practically operating processing units is calculated according to the target frequencies and current temperatures, the sum of the current values is compared with the relative current value determined as the reference, and if the sum of the current values is lower than the relative current value, a target frequency corresponding to the sum of the current values may be determined as an operating frequency to be selected of the currently operating processing units. When a highest operating frequency to be selected is determined, the highest operating frequency to be selected is set to be the operating frequency of the currently operating processing units. That is, within a range of the relative current value, it not only may meet an operating condition of the processing units to achieve current suppression and improve efficiency of the processing units, but also may prevent suppression of operating performance of the processing units, thereby improving a user experience.

In the embodiments of the disclosure, the system for controlling a processing unit may be implemented by a personal computer during a practical application. The control module 30, instant power calculator 10 and processing unit group component 50 in the system for controlling a processing unit may all be implemented by a CPU, Digital Signal Processor (DSP), Microcontroller Unit (MCU) or Field-Programmable Gate Array (FPGA) in the system during the practical application; and the memory 40 in the system for controlling a processing unit is implemented by a memory in the system during the practical application.

Each technical characteristic of the abovementioned embodiments may be freely combined. For brief description, not all possible combinations of each technical characteristic in the abovementioned embodiments are described. However, combinations of these technical characteristics may be considered to fall within the scope recorded in the specification without conflicts.

In some embodiments provided by the application, it should be understood that the disclosed device and method may be implemented in another manner. The device embodiment described above is only schematic, and for example, division of the units is only a division of logic function, and other division manners may be adopted during practical implementation. For example, multiple units or components may be combined or integrated into another system, or some characteristics may be neglected or not executed. In addition, coupling, or direct coupling or communication connection between each displayed or discussed component may be indirect coupling or communication connection, implemented through some interfaces, of the equipment or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, the function units in each embodiment of the disclosure may be integrated into a processing unit, each unit may also exist independently, and two or more than two units may also be integrated into a unit. The integrated unit may be implemented in a hardware form, and may also be implemented in form of hardware and software function unit.

Those skilled in the art should know that: all or part of the steps of the abovementioned method embodiment may be implemented by instructing related hardware through a program, the abovementioned program may be stored in a computer-readable storage medium, and the program is executed to execute the steps of the abovementioned method embodiment; and the storage medium includes various media capable of storing program codes such as mobile storage equipment, a Read-Only Memory (ROM), a Random Access Memory (RAM), a magnetic disk or an optical disk.

Or, when being implemented in form of software function module and sold or used as an independent product, the integrated unit of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a piece of computer equipment (which may be a personal computer, a server, network equipment or the like) to execute all or part of the method in each embodiment of the disclosure. The abovementioned storage medium includes: various media capable of storing program codes such as mobile storage equipment, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

INDUSTRIAL APPLICABILITY

According to the technical solutions of the embodiments of the disclosure, the relative current value is determined in advance, and then the relative current value is determined as a reference. Then, the sum of the current values of the practically operating processing units is calculated according to the target frequencies and current temperatures, the sum of the current values is compared with the relative current value determined as the reference, and if the sum of the current values is lower than the relative current value, a target frequency corresponding to the sum of the current values may be determined as an operating frequency to be selected of the currently operating processing units. When a highest operating frequency to be selected is determined, the highest operating frequency to be selected is set to be the operating frequency of the currently operating processing units. That is, within a range of the relative current value, it not only may meet an operating condition of the processing units to achieve current suppression and improve efficiency of the processing units, but also may prevent suppression of operating performance of the processing units, thereby improving a user experience.

The invention claimed is:

1. A method for controlling a processing unit, comprising:
   determining a relative current value;
   determining target frequencies corresponding to all currently operating processing units, determining temperatures of all the currently operating processing units, and calculating a sum of current values of all the currently operating processing units based on each of the target frequencies and the temperatures, wherein the target frequencies corresponding to each operating processing unit are a series of operable frequencies of the processing unit; and
   comparing the calculated sum of the current values with the determined relative current value, and in the case that the sum of the current values is lower than the relative current value, determining target frequency, from among the target frequencies, corresponding to the sum of the current values as an operating frequency to be selected;
   wherein determining the relative current value comprises:
   determining performance corresponding to a system requirement and/or an application requirement; and
   determining the relative current value according to the performance,
   and wherein the performance is defined by "temperature (° C.)|number of processing units|operating frequency (MHz)".

2. The method for controlling a processing unit according to claim 1, wherein the determining the performance corresponding to the system requirement and/or the application requirement comprises:
   acquiring a total number of required processing units according to the system requirement and/or the application requirement;
   acquiring operating frequencies required by the processing units according to the system requirement and/or the application requirement; and
   determining temperatures of the processing units.

3. The method for controlling a processing unit according to claim 1, wherein the calculating the sum of the current values of all the currently operating processing units based on each of the target frequencies and the temperatures comprises:
   calculating a current value of each processing unit based on the target frequency and temperature of each processing unit; and adding the calculated current values to obtain the sum of the current values of all the operating processing units.

4. The method for controlling a processing unit according to claim 3, further comprising:
   sequencing the target frequencies from high to low, calculating a sum of current values, corresponding to a highest target frequency, of all the currently operating processing units initially, and in the case that the calculated sum of the current values is higher than the relative current value, determining next target frequency according to a sequence of the target frequencies, and calculating a sum of current values, corresponding to the next target frequency, of all the currently operating processing units.

5. A system for controlling a processing unit, comprising:
   a control module, configured to determine a relative current value and to determine target frequencies corresponding to all currently operating processing units;
   a temperature sensor, configured to determine temperatures of all the currently operating processing units;
   an instant power calculator, configured to calculate a sum of current values of all the currently operating processing units based on each of the target frequencies and the temperatures, wherein the target frequencies corresponding to each operating processing unit are a series of operable frequencies of the processing unit, the control module being further configured to compare the calculated sum of the current values with the determined relative current value, and in the case that the sum of the current values is lower than the relative current value, determine a target frequency, from among the target frequencies, corresponding to the sum of the current values as an operating frequency to be selected; and a processing unit group component, configured to receive the operating frequency to be selected, and set the operating frequency to be selected as an operating frequency of all the currently operating processing units;

wherein the control module is further configured to determine performance corresponding to a system requirement and/or an application requirement, and to determine the relative current value according to the performance, and wherein the performance is defined by "temperature (° C.)|number of processing units|operating frequency (MHz)".

6. The system for controlling a processing unit according to claim 5, wherein the control module is further configured to acquire a total number of required processing units according to the system requirement and/or the application requirement;

the control module is further configured to acquire operating frequencies required by the processing units according to the system requirement and/or the application requirement; and the temperature sensor is further configured to determine temperatures of the processing units.

7. The system for controlling a processing unit according to claim 5, wherein the instant power calculator is further configured to calculate a current value of each processing unit based on the target frequency and temperature of each processing unit, and add the calculated current values to obtain the sum of the current values of all the operating processing units.

8. The system for controlling a processing unit according to claim 5, wherein the control module is further configured to sequence the target frequencies from high to low, calculate a sum of current values, corresponding to a highest target frequency, of all the currently operating processing units initially, and in the case that the calculated sum of the current values is higher than the relative current value, determine next target frequency according to a sequence of the target frequencies, and calculate a sum of current values, corresponding to the next target frequency, of all the currently operating processing units.

9. A non-transitory computer storage medium having stored therein computer-executable instructions that, when executed by a processor, cause the processor to execute a method for controlling a processing unit, wherein the method comprising:

determining a relative current value;

determining target frequencies corresponding to all currently operating processing units, determining temperatures of all the currently operating processing units, and calculating a sum of current values of all the currently operating processing units based on each of the target frequencies and the temperatures, wherein the target frequencies corresponding to each operating processing unit are a series of operable frequencies of the processing unit; and comparing the calculated sum of the current values with the determined relative current value, and in the case that the sum of the current values is lower than the relative current value, determining a target frequency, from among the target frequencies, corresponding to the sum of the current values as an operating frequency to be selected;

wherein determining the relative current value comprises:

determining performance corresponding to a system requirement and/or an application requirement; and determining the relative current value according to the performance;

and wherein the performance is defined by "temperature (° C.)|number of processing units|operating frequency (MHz)".

10. The non-transitory computer storage medium according to claim 9, wherein determining the performance corresponding to the system requirement and/or the application requirement comprises:

acquiring a total number of required processing units according to the system requirement and/or the application requirement;

acquiring operating frequencies required by the processing units according to the system requirement and/or the application requirement; and determining temperatures of the processing units.

11. The non-transitory computer storage medium according to claim 9, wherein the calculating the sum of the current values of all the currently operating processing units based on each of the target frequencies and the temperatures comprises:

calculating a current value of each processing unit based on the target frequency and temperature of each processing unit; and adding the calculated current values to obtain the sum of the current values of all the operating processing units.

12. The non-transitory computer storage medium according to claim 11, wherein the method further comprising:

sequencing the target frequencies from high to low, calculating a sum of current values, corresponding to a highest target frequency, of all the currently operating processing units initially, and in the case that the calculated sum of the current values is higher than the relative current value, determining next target frequency according to a sequence of the target frequencies, and calculating a sum of current values, corresponding to the next target frequency, of all the currently operating processing units.

* * * * *